(12) United States Patent
Knapp et al.

(10) Patent No.: US 9,111,174 B2
(45) Date of Patent: Aug. 18, 2015

(54) MACHINE LEARNNG TECHNIQUES FOR PECTORAL MUSCLE EQUALIZATION AND SEGMENTATION IN DIGITAL MAMMOGRAMS

(71) Applicant: Riverain Technologies, LLC, Miamisburg, OH (US)

(72) Inventors: Jason F. Knapp, Miamisburg, OH (US); Steve W. Worrell, Springboro, OH (US); Aarti Raheja, Centerville, OH (US)

(73) Assignee: Riverain Technologies, LLC, Miamisburg, OH (US)

( * ) Notice: Subject to any disclaimer, the term of this patent is extended or adjusted under 35 U.S.C. 154(b) by 228 days.

(21) Appl. No.: 13/714,111

(22) Filed: Dec. 13, 2012

(65) Prior Publication Data

US 2013/0223711 A1  Aug. 29, 2013

Related U.S. Application Data

(60) Provisional application No. 61/602,784, filed on Feb. 24, 2012.

(51) Int. Cl.
*G06K 9/00* (2006.01)
*G06K 9/62* (2006.01)
*G06T 7/00* (2006.01)

(52) U.S. Cl.
CPC ............. *G06K 9/62* (2013.01); *G06T 7/0081* (2013.01); *G06T 7/0097* (2013.01); *G06T 2207/10116* (2013.01); *G06T 2207/20081* (2013.01); *G06T 2207/20224* (2013.01); *G06T 2207/30068* (2013.01)

(58) Field of Classification Search
None
See application file for complete search history.

(56) References Cited

U.S. PATENT DOCUMENTS

| | | | |
|---|---|---|---|
| 5,724,456 A * | 3/1998 | Boyack et al. | 382/274 |
| 7,221,807 B2 * | 5/2007 | Campbell | 382/274 |
| 2004/0170316 A1 * | 9/2004 | Saquib et al. | 382/162 |
| 2005/0008211 A1 | 1/2005 | Xu et al. | |
| 2008/0144945 A1 * | 6/2008 | Merlet et al. | 382/225 |
| 2008/0159613 A1 * | 7/2008 | Luo et al. | 382/132 |
| 2010/0104151 A1 * | 4/2010 | Bertens | 382/128 |
| 2010/0266189 A1 | 10/2010 | Knapp et al. | |
| 2011/0013819 A1 * | 1/2011 | Raundahl et al. | 382/132 |
| 2011/0026791 A1 * | 2/2011 | Collins et al. | 382/131 |
| 2011/0123074 A1 * | 5/2011 | Nie et al. | 382/128 |

(Continued)

OTHER PUBLICATIONS

Cardoso, Jaime S., and Maria J. Cardoso. "Towards an intelligent medical system for the aesthetic evaluation of breast cancer conservative treatment." Artificial Intelligence in Medicine 40.2 (2007): 115-126.*

(Continued)

*Primary Examiner* — Chan Park
*Assistant Examiner* — Geoffrey E Summers
(74) *Attorney, Agent, or Firm* — Panitch Schwarze Belisario & Nadel LLP

(57) ABSTRACT

Image analysis techniques applicable to mammograms and other types of images may include image normalization, image segmentation, forming a prediction bias image, and creating an equalized image based on the prediction bias image. Creation of the equalized image may include subtraction of the prediction bias image from the original image. Forming the prediction bias image may involve the use of trained predictors.

47 Claims, 8 Drawing Sheets

(56) References Cited

U.S. PATENT DOCUMENTS

2012/0087565 A1* 4/2012 Garud et al. .................. 382/132
2013/0070983 A1* 3/2013 Rezaee et al. ................. 382/128

OTHER PUBLICATIONS

Lindeberg, Tony. Encyclopedia of Computer Science and Engineering (Benjamin Wah, ed), John Wiley and Sons, vol. IV, pp. 2495-2504, Hoboken, New Jersey, 2009.*

Nagi, Jawad, et al. "Automated breast profile segmentation for ROI detection using digital mammograms." Biomedical Engineering and Sciences (IECBES), 2010 IEEE EMBS Conference on. IEEE, 2010.*

Raba, David, et al. "Breast segmentation with pectoral muscle suppression on digital mammograms." Pattern Recognition and Image Analysis. Springer Berlin Heidelberg, 2005. 471-478.*

Schmid-Saugeona, Philippe, Joël Guillodb, and Jean-Philippe Thirana. "Towards a computer-aided diagnosis system for pigmented skin lesions." Computerized Medical Imaging and Graphics 27.1 (2003): 65-78.*

N. Karssemeijer, "Automated classification of parenchymal patterns in Mammograms", Phys. Med. Biol. 43 (1998) 365-378.

R. J. Ferrari, R. M. Rangayyan, J.E.L. Desautels, R.A. Borges, A. F. Frere, "Automatic Identification of the Pectoral Muscle in Mammograms", IEEE Trans. Med. Imag., vol. 23, No. 2, Feb. 2004.

* cited by examiner

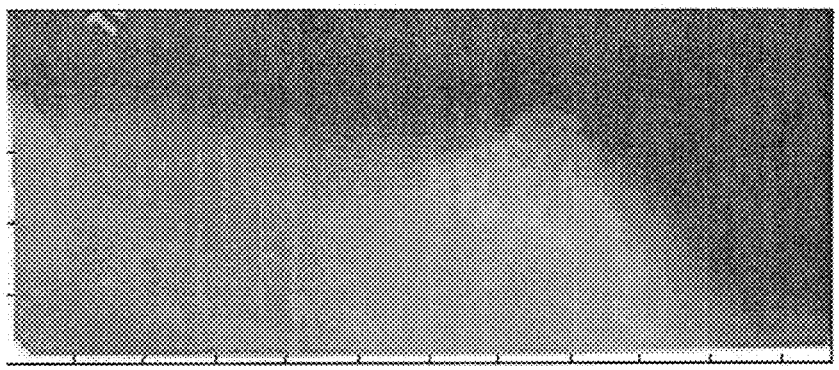
Fig. 3D PME
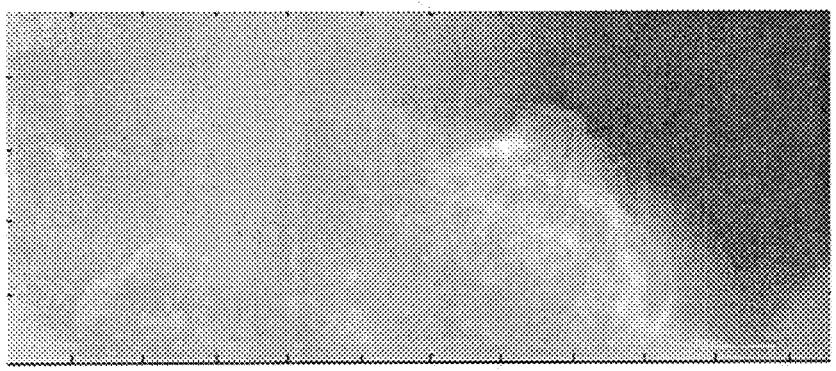
Fig. 3C Contrast
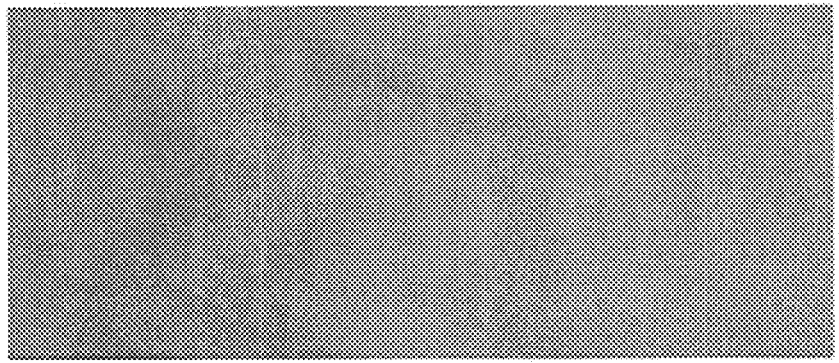
Fig. 3B Breast Average
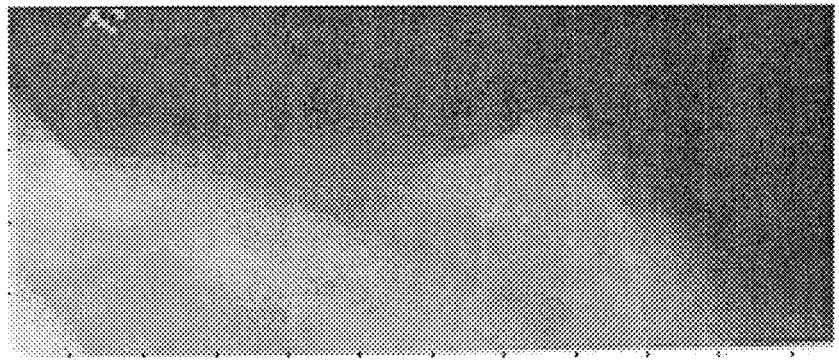
Fig. 3A Original

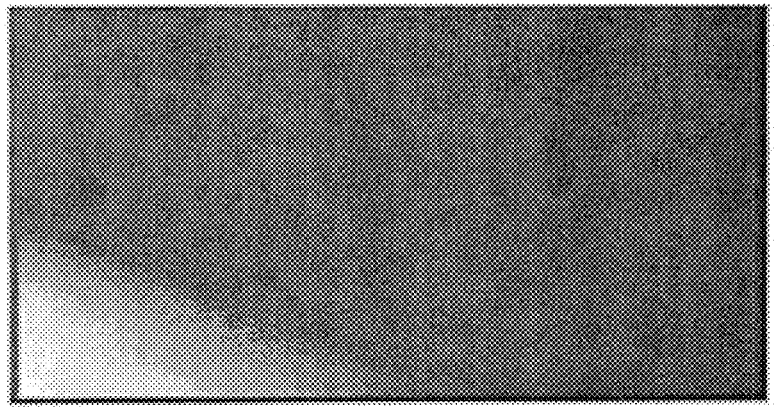
Fig. 4C PBI
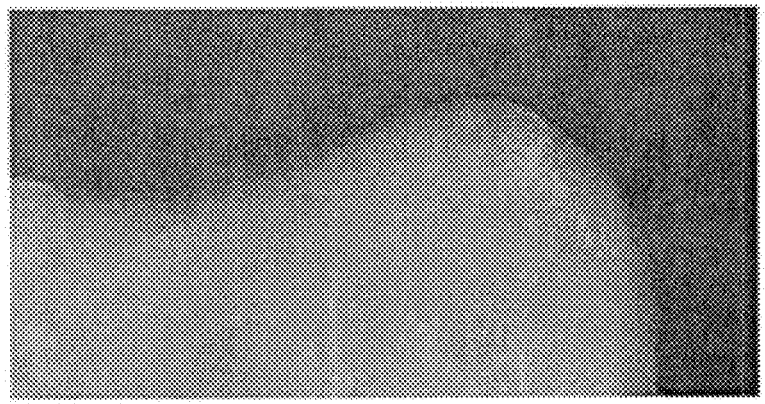
Fig. 4B Equalized Image
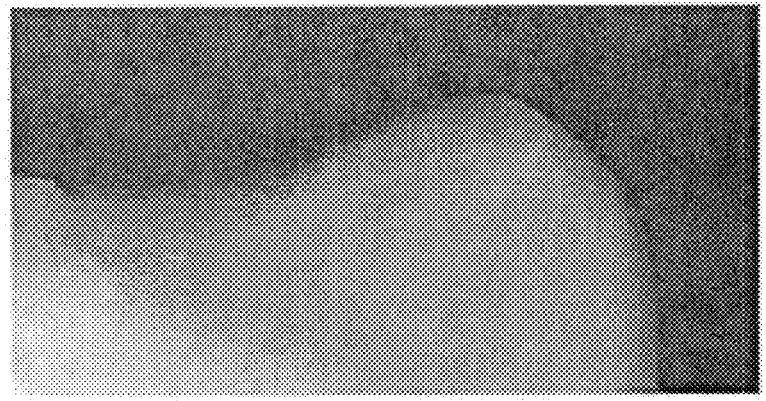
Fig. 4A Original Image

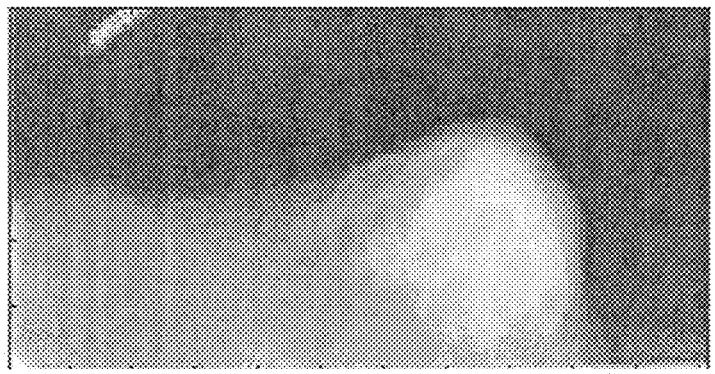
Fig. 8B Equalized
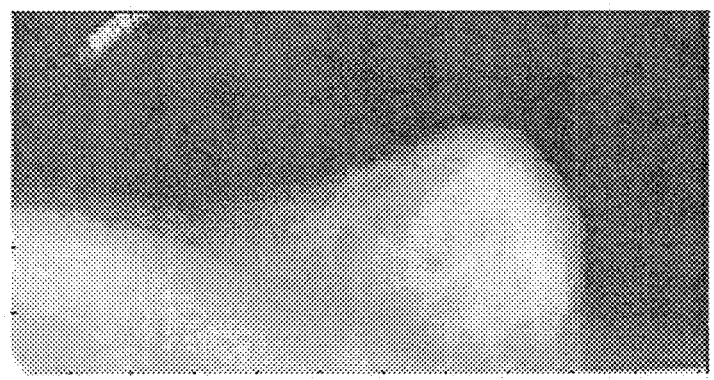
Fig. 8A Original
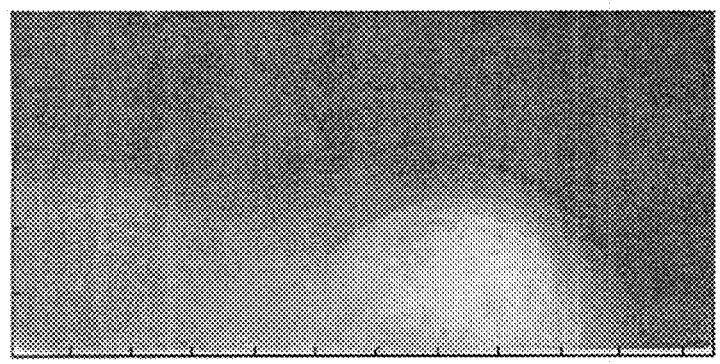
Fig. 7B Equalized
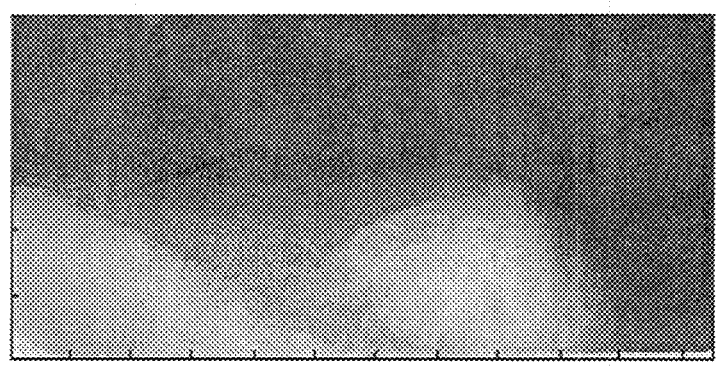
Fig. 7A Original

MACHINE LEARNNG TECHNIQUES FOR PECTORAL MUSCLE EQUALIZATION AND SEGMENTATION IN DIGITAL MAMMOGRAMS

CROSS-REFERENCE TO RELATED APPLICATION

The present application claims priority to U.S. Provisional Patent Application No. 61/602,784, filed on Feb. 24, 2012, which is incorporated by reference herein.

FIELD OF ENDEAVOR

Various embodiments of the invention may relate to automated analysis techniques for medical images, for example, in mammograms.

BACKGROUND

There are many challenges in developing fully automatic analysis systems for medical images: sensor noise and artifacts, anatomic variability, differences between acquisition protocols. To get robust results, each of these sets of challenges may be addressed in a systematic and principled way.

It has long been recognized that the presence of the pectoral muscle can substantially interfere with automated analysis algorithms and visualization of the breast. For example, algorithms for detection of mass lesions, estimation of breast density, or the registration of a current examination with a prior examination can all be significantly influenced by the presence of the pectoral muscle. Therefore, it is not surprising to find a large amount of literature on the problem of segmenting the pectoral muscle. The results from a pectoral muscle segmentation algorithm can be used explicitly and/or implicitly. Explicit use means that pixels within a segmentation mask may simply be ignored or treated separately (e.g., dense tissue segmentation). Implicit use means that the segmentation result may be used to suppress (equalize) the gray scale bias in the pectoral region. Implicit use, while highly desirable, is a challenge, as imperfect segmentation can lead to suppression artifacts.

SUMMARY OF EMBODIMENTS OF THE INVENTION

Various embodiments of the present invention may includes apparatus, methods, and/or computer-program products that may be used to address, for example, the segmentation of the pectoral muscle in mammograms. These techniques may also be used in other ways.

BRIEF DESCRIPTION OF THE DRAWINGS

Various embodiments of the invention will now be described in detail, in conjunction with the accompanying drawings, in which:

FIG. 1, which includes

FIG. 3, which includes FIGS. 3A-3D, shows images relating to the production of a pectoral muscle equalized (PME) image, according to various embodiments of the invention;

FIG. 4, which includes FIGS. 4A-4C, shows images relating to the production of a pectoral bias image (PBI), according to various embodiments of the inversion;

FIG. 7, which includes FIGS. 7A and 7B, and FIG. 8, which includes FIGS. 8A and 8B, show pectoral equalization examples that may be obtained using various embodiments of the invention.

DETAILED DESCRIPTION OF VARIOUS EMBODIMENTS OF THE INVENTION

The approach that may be taken in various embodiments of the invention may be summarized as follows. One may begin by recognizing that the suppression of structures within an image can be infeasible due to the intrinsic difficulty of the segmentation problem. What's more, even if there is a solution. It might be computationally impractical for on-line use. Various embodiments of the invention may address these issues by adopting a predictive approach. In an off-line setting, where perfect knowledge of the pectoral muscle's location owing to highly accurate manual outlines may be obtained, one may create very high-fidelity suppression results (that is, create images where the pectoral muscle bias has been equalized). These pectoral-muscle equalized images may then be used as "target images" for a predictive process. Given an accurate prediction of the image without the pectoral muscle, one may then subtract this image from the original to obtain a bias image. This bias image may then provide an image on which to carry out a segmentation process, for example, where explicit use may be made of the pectoral muscle location (e.g., as a landmark for image registration).

Furthermore, using a combination of image processing and/or machine learning techniques, various embodiments of the present invention may be able to estimate the bias associated with the pectoral muscle at each pixel location. This "soft segmentation" approach may be more flexible than conventional methods. For example, it may result in an equalized image that may be substantially free of segmentation artifacts; it may produce an image from which a highly accurate segmentation may be obtained; and/or embodiments of the invention may be adapted to work on cranio-caudal (CC) views. The methodology may further be useful in a wide variety of medical and non-medical contexts.

Figure 1C:
FIGS. 1A-1C, shows various examples of pectoral muscle outlines.
Figure 1B:
Figure 1A:
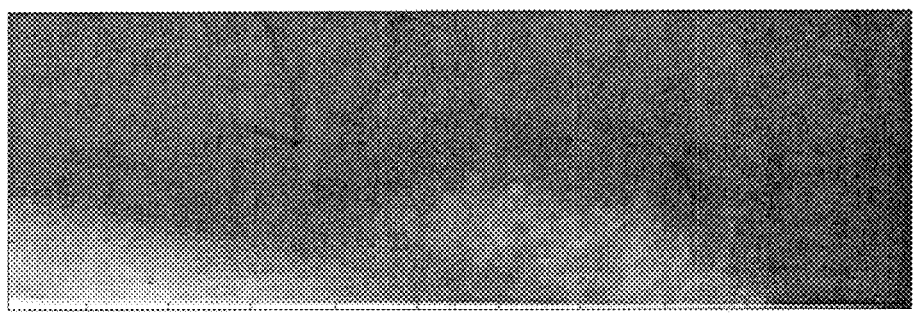

Further details of various embodiments will now be presented. FIG. 1 (FIGS. 1A-1C) shows manual outlines for three different (digitized) mammograms. As can be ascertained from these examples, the contrast of the pectoral muscle region may be highly variable from one image to the next.

Figure 2:
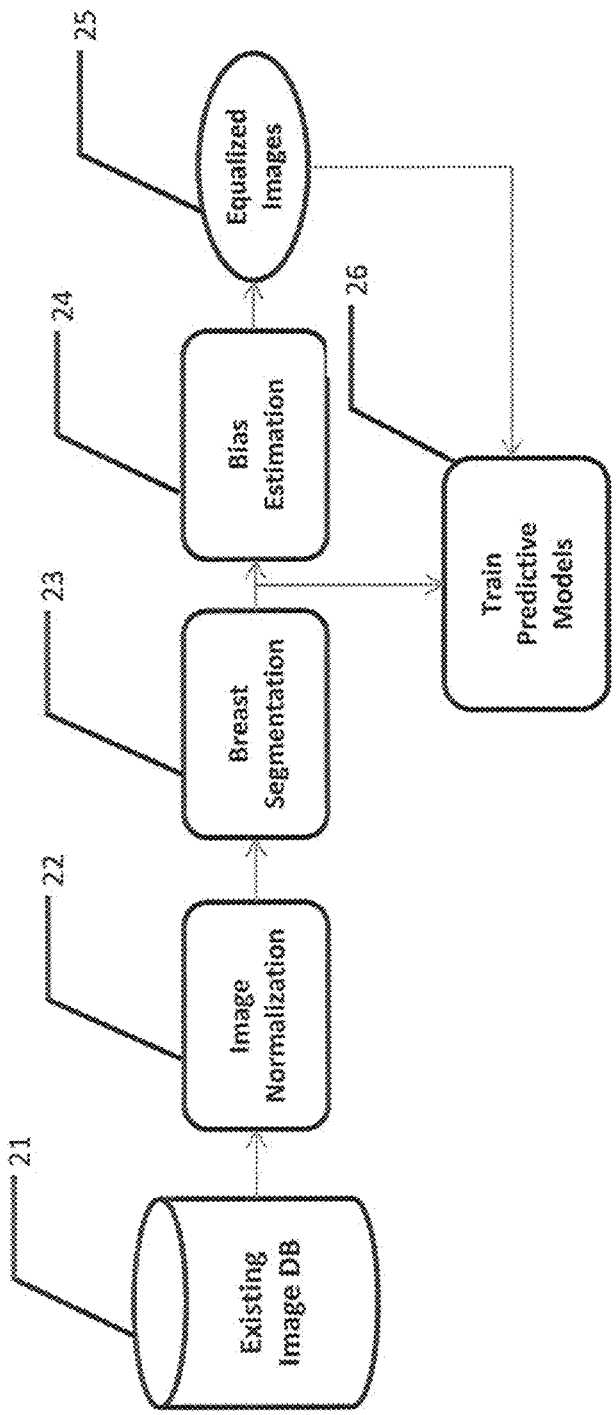
FIG. 2 shows a conceptual diagram of a process that may be used in prediction according to various embodiments of the invention.

As mentioned above, an approach that may be used in embodiments of the invention is to build a model capable of predicting a pectoral equalized image. The equalized images may be termed using, in part, manual outlines like those shown in FIG. 1. Several steps may be involved in forming a pectoral muscle equalized (PME) image. As illustrated in FIG. 2, which shows an overall process of building a predictor for equalized images, according to various embodiments of the invention (and it is noted that this need not be limited to pectoral equalized images, but rather, it may be generalized to other types of equalized images), the process may involve image normalization 22 of an existing image (which may be obtained, for example, from an image database 21; however, the invention is not limited to this, and images may be obtained from elsewhere). The normalization 22 may involve an algorithm used for chest x-rays, examples of which can be found in previous work by the present inventors (see, e.g., U.S. Patent Application Publication Nos. 2005/0008211 and 2010/0266189, which are incorporated by reference herein).

The process may then proceed by applying breast segmentation 23 (or other segmentation, as may be appropriate to the type of image) to the normalized image. There are many different techniques for breast segmentation 23 (and image segmentation, in general), which include many techniques known in the art. One example approach, to which the invention is not limited, may use a combination of iterative filtering, e.g., by thresholding, and morphological, processing.

Given the segmented breast contour and the manual outline of the pectoral muscle, one would like to estimate the PME image, as part of performing bias estimation 24. FIG. 3 (FIGS. 3A-3C) details the images that may be used in the formation of the PME image (FIG. 3D). This may begin with estimating an average breast-fat value along each row of pixels in the image (FIG. 3A), where pixels from the pectoral region are excluded. This may be done, for example, by averaging the lowest 10% of the pixels within each row, where pixels too close to the skin line may be ignored in order to compensate for breast-thickness variation. A "breast average" image (FIG. 3B) may be created by creating an image equal in size to the original (FIG. 3A), but where each row of pixels may be set to the corresponding breast average for that row. A small amount of smoothing, e.g., Gaussian smoothing, may then be applied in order to minimize unevenness in the gray scales (this is reflected in FIG. 3B). One may next create an image to capture the local contrast within the pectoral muscle region (FIG. 3C). This may be done, for example, using a combination of smoothing and morphological processing, where care may need to be taken at the pectoral muscle boundary so as to not bias the contrast estimates. Also, the contrast values within the pectoral muscle region may be modified, e.g., by applying histogram specification to the contrast values within the pectoral muscle region, to better match the values within the breast region—this may provide compensation for an intrinsic loss of contrast associated with the increased tissue density. One may then replace each pixel within the pectoral muscle region by adding the corresponding breast average (FIG. 3B) and contrast (FIG. 3C) estimates on a pixel-by-pixel basis. Some post-processing (e.g., smoothing and/or filtering) may be used to blend pixels near the pectoral muscle's edge. The result may be a PME image, an example of which is shown in FIG. 3D.

The above may be repeated for a set of images in order to obtain sets of image data that may be used for bias estimation 24 and to train predictive models 26, as will be explained further below. In an implementation by the inventors, a set of images that had pectoral muscle truth—a relatively small subset of images available to the inventors—were used for this purpose. The images that were selected for outlining were chosen in order to capture a wide range of pectoral muscle appearance.

Training predictive models 26 may include the training of one or more multi-layer perception (MLP) neural networks, for example. This may involve the use of early stopping, which may serve to regularize the resulting prediction models. A number of hidden nodes in the MLP may be determined experimentally, as may be the number of training cycles needed to perform adequate training. Extracted image features may be standardized, e.g., to zero-mean and unit variance, prior to training the prediction models.

In further detail, in a particular implementation by the inventors, to which the invention is not necessarily limited, a subset of images was selected from a database of digitized mammograms. An outline of the pectoral muscle was manually-generated for each selected image. A breast outline was also generated using an automated method (although a manual outline could, alternatively, have been used). A portion of these images were set aside to use for later evaluation (i.e., comparing a predicted pectoral bias image to a desired pectoral bias image). A training data set (matrix) was formed by collecting features values within the breast across each image (other than those set aside for evaluation); note that specific types of features that may be used are discussed below (in conjunction with FIG. 5), as are the roles of the trained prediction models. A target value for each pixel (which may correspond to a value of the pectoral bias image) was also recorded. The matrix of pixel features was standardized so that each feature had a mean of zero and unit variance. The mean and variance values used for scaling were then recorded and applied to future inputs (when the models were actually used for estimation of images outside the training set). The MLP neural networks were then trained for regression modeling, and the complexity of the models was controlled using early stopping techniques. The number of hidden nodes and training cycles were determined experimentally. After completion of training, the models were evaluated using the portion of images that were set aside for evaluation purposes, in order to assess the ability of the models to generalize beyond the training data. After this verification, the prediction models were ready for use in actual prediction.

Once the PME images have been formed, predictive models may be created, which may be used for predicting the pectoral bias image 24. The pectoral bias image (PBI) is defined herein as an image formed by subtracting the PME image from the original image. An example PBI can be seen in FIG. 4C, where the images shown in FIGS. 4A and 4B are corresponding original and PME images.

Figure 5:
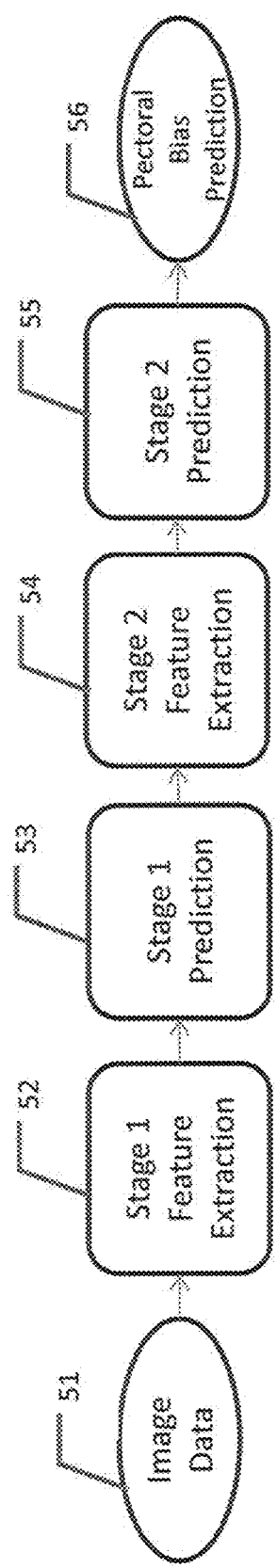
FIG. 5 shows a conceptual diagram of a prediction framework, according to various embodiments of the invention.

The trained prediction models obtained in block 26 of FIG. 2 may then be incorporated, e.g., into a two-stage prediction approach, as shown in FIG. 5. The inputs to the process shown in FIG. 5 may be the original image and its corresponding breast segmentation. The image data may be resized to a convenient and appropriate resolution, which, in an implementation by the inventors (to which the invention is not limited), was 1 mm per pixel. Changing the resolution in such a fashion may allow for much an improvement in computational speed with little or no loss in performance. In various embodiments, the chest-wall may be placed on the left-hand side of images to allow for consistent processing of left and right breasts; however, this is a convenient representation, and the invention is not limited to this representation.

The process of FIG. 5 may apply a first feature extraction stage 52 to input image data 51. The first stage of feature extraction may compute one or more of the following sets of image features:

Gaussian 2-jet, including the shape-index image, e.g., at five different scales;
Morphological opening image, e.g., at five difference disk sizes;
The difference between the image value and a smoothed estimate of the row-wise breast minimum value;
Distance from the skin-line normalized by the breast width;

Relative vertical and horizontal pixels locations within the breast.

Using the image features obtained in this first feature extraction stage 52, a neural network, for example, may be used at the first prediction stage 53 to arrive at an initial pectoral bias estimate. The neural network in first prediction stage 53 may correspond to a trained prediction model obtained in block 26 above. Prior to submission of features to the first prediction stage 53, the features values at pixel locations in the breast region may be collected into a feature matrix, which may then be standardized (e.g., as discussed above in conjunction with the training of the prediction models 26). This initial estimate may men be used in a second feature extraction stage 54 to derive one or more of the following features:

Initial PBI estimate;
Gaussian 2-jet, e.g., at four different scales.

These features, along with those that were computed in the first feature extraction stage 52, may then be fed into a second stage prediction 55, which, again, may be implemented, in an example implementation to which the invention is not limited, in the form, of a neural network. Again, formation of a feature matrix and/or standardization may be performed prior to the second prediction stage 55, which may be done similarly to as discussed above. The output of this model may be post-processed to remove spurious prediction results within the breast region while smoothing estimates with the pectoral muscle region, to obtain a prediction, of pectoral bias 56; this may involve, e.g., filtering/smoothing processes. A resulting PBI estimate may be converted into an image in which pixels outside the breast region may be assigned a value of zero.

Figure 6:
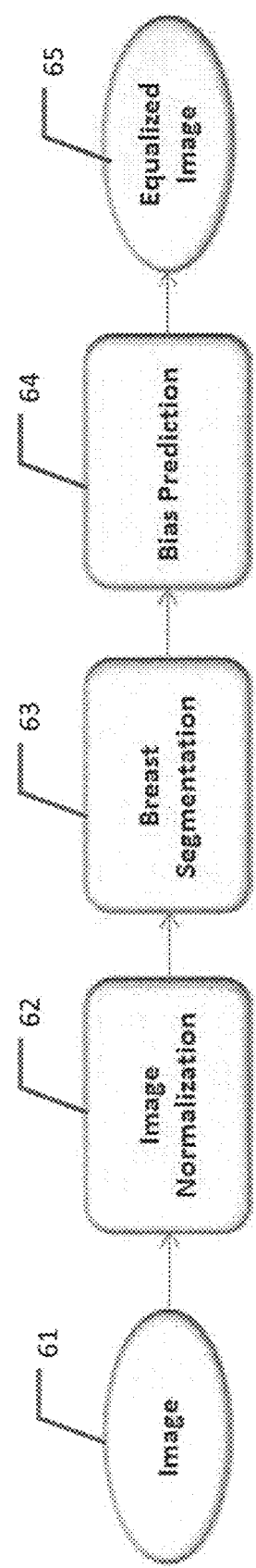
FIG. 6 shows a conceptual diagram of an equalization algorithm according to various embodiments of the invention.

FIG. 6 shows a simplified diagram of the entire process (corresponding to the portion of FIG. 2 including reference numerals 21-25, which correspond to reference numerals 61-65 in FIG. 6, except that block 64 replaces the "Bias Estimation" 24 of FIG. 2 with "Bias Prediction" 64). As shown, the PBI estimate obtained at block 64 (in which the process of FIG. 5 may be used) may be used to derive the equalized image (e.g., by subtracting it fern the input image) at block 65; and it is also at this point where one may derive an explicit segmentation of the pectoral muscle using the same image.

Some examples of automatically generated equalized images, on data not used for the developing the models, can be seen FIGS. 7 and 8. In FIGS. 7 and 8, FIGS. 7A and 8A show original images, and FIGS. 7B and 8B show corresponding equalized images.

Figure 9:
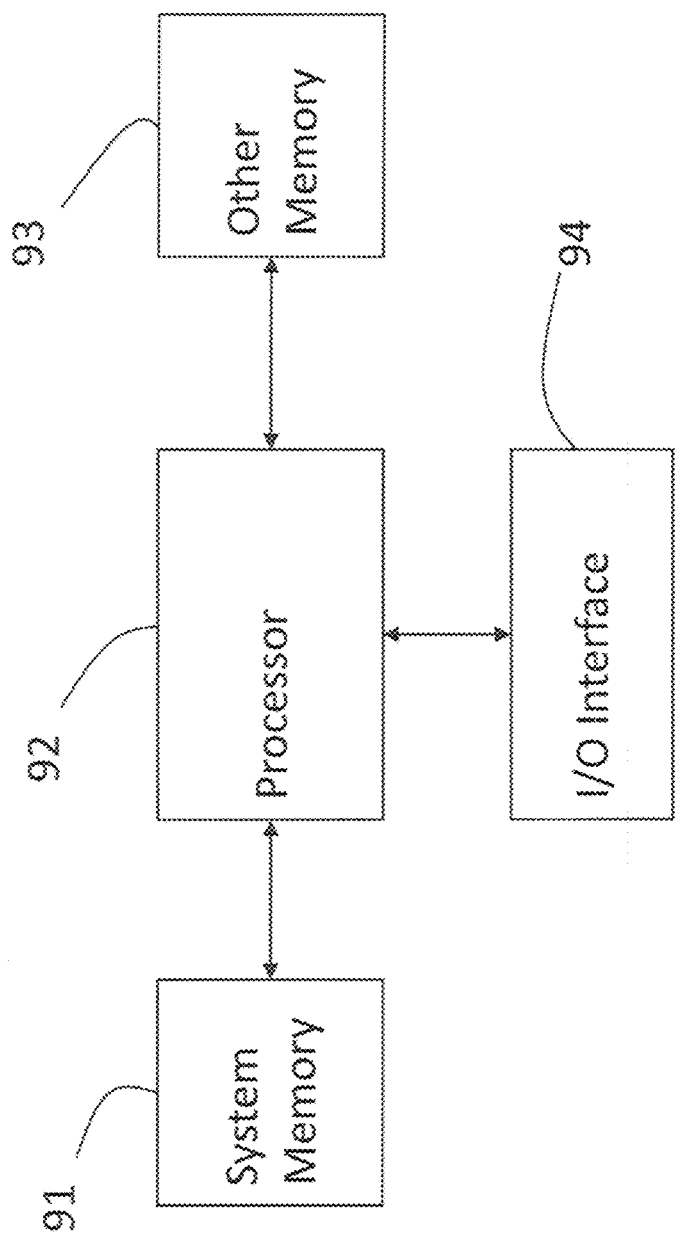
FIG. 9 shows a system in which various embodiments of the invention may be implemented.

Various embodiments of the invention may comprise hardware, software, and/or firmware. FIG. 9 shows an exemplary system that may be used to implement various forms and/or portions of embodiments of the invention. Such a computing system may include one or more processors 92, which may be coupled to one or more system memories 91. Such system memory 91 may include, for example, RAM, ROM, or other such machine-readable media, and system memory 91 may be used to incorporate, for example, a basic I/O system (BIOS), operating system, instructions for execution by processor 92, etc. The system may also include further memory 93, such as additional RAM, ROM, hard disk drives, or other processor-readable media. Processor 92 may also be coupled to at least one input/output (I/O) interlace 94. I/O interface 94 may include one of more user interfaces, as well as readers for various types of storage media and/or connections to one or more communication networks (e.g., communication interfaces and/or modems), from which, for example, software code may be obtained or provided (e.g., by downloading or uploading).

While the above techniques have been described in the context of breast image processing, their uses are not limited to this. The techniques described in this document may have many potential uses. These techniques may be used in at least the following ways:

1. Generating a mammogram image (of an arbitrary view type) in which the gray scale bias associated with the pectoral muscle has been suppressed;
2. Using the equalized image in computer-aided searches for lesions, particularly those near or within the pectoral muscle region (e.g., computer-aided diagnosis (CAD));
3. Using the bias image to derive a segmentation of the pectoral muscle image;
4. Using the segmentation of the pectoral muscle image (as in Item 3) to derive landmarks for image registration;
5. Using the segmentation of the pectoral muscle image (as in Item 3) to derive location features for CAD analysis;
6. Using the equalized image to aid or improve the estimation of breast density;
7. Using the equalized image to aid or improve the breast type classification;
8. Using the described methodology in mammographic view;
9. Applying the described methodology in related modalities, for example, tomosynthesis, breast magnetic resonance imaging (MRI), or breast computer tomography (CT).
10. Applying the described methodology in other related image equalization problems, e.g., breast implant equalization, artifact equalization related to other medical imaging modalities or otherwise (e.g., radar imaging, infrared imaging, visual imaging, sonar imaging), and signal trace applications, such as, for example, electrocardiogram (EKG), electroencephalogram (EEG), etc., and/or applications such as artifact suppression in radar imaging.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

We claim:

1. A method of processing images, comprising:
   normalizing an image to obtain a normalized image;
   segmenting the normalized image to obtain a segmented image;
   forming a prediction bias image using features derived from the image, the normalized image, the segmented image, or a combination thereof, and used as inputs to at least one trained predictor, wherein forming a prediction bias image comprises:
      obtaining a first set of image features derived from the image, the normalized image, the segmented image, or a combination thereof;
      applying the first set of image features to a first trained predictor to obtain a first prediction image;
      obtaining a second set of image features derived at least in part from the first prediction image;
      applying the second set of image features to a second trained predictor to obtain a second prediction image; and
      applying smoothing to at least a portion of the second prediction image; and
   creating an equalized image using the prediction bias image.

2. The method of claim 1, wherein creating an equalized image includes subtracting the prediction bias image from the image.

3. The method of claim 1, wherein the image comprises a breast image.

4. The method of claim 3, further comprising utilizing the equalized image m performing one or more of breast density estimation or breast type classification.

5. The method of claim 1, further comprising applying at least one computer-aided diagnosis technique to the equalized image.

6. The method of claim 1, further comprising forming a further segmented image based on the equalized image and using the further segmented image to derive one or more landmarks for image registration or to derive one or more location features for computer-aided diagnosis.

7. The method of claim 1, further comprising downloading executable instructions that, upon execution, result in the implementation of said normalizing an image to obtain a normalized image; said segmenting the normalized image to obtain a segmented image; said forming a prediction bias image using features derived from the image, the normalized image, the segmented image, or a combination thereof, and used as inputs to at least one trained predictor; and said creating an equalized image using the prediction bias image.

8. The method of claim 1, further comprising making available for download executable instructions that, upon execution, result in the implementation of said normalizing an image to obtain a normalized image; said segmenting the normalized image to obtain a segmented image; said forming a prediction bias image using features derived from the image, the normalized image, the segmented image, or a combination thereof, and used as inputs to at least one trained predictor; and said creating an equalized image using the prediction bias image.

9. A method of processing images, comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
creating an equalized image using the prediction bias image,
wherein the first set of image features includes at least a subset of features selected from the group consisting of: Gaussian 2-jet at multiple scales; morphological opening image at multiple disk sizes; differences between image values and smoothed estimates of row-wise minimum image values; normalized distances; and relative vertical and horizontal pixel locations.

10. A method of processing images, comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
creating an equalized image using the prediction bias image,
wherein the second set of image features includes the first prediction image and Gaussian 2-jet at multiple scales.

11. A method of processing images, comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor; and
creating an equalized image using the prediction bias image; and
training the at least one trained predictor, wherein the training comprises:
normalizing a training image selected from a set of training images to obtain a normalized training image;
segmenting the normalized training image to obtain a segmented training image;
forming a prediction bias estimation image;
subtracting the prediction bias estimation image from the normalized training image to obtain an equalized training image; and
applying the segmented training image and the equalized training image to train the at least one trained predictor.

12. The method of claim 11, wherein forming the prediction bias estimation image includes:
creating an averaged training image;
creating a local contrast training image;
adding the averaged training image and the local contrast training image to obtain a combined training image;
replacing at least a subset of pixels of the normalized training image with at least a subset of pixels of the combined training image to obtain a modified normalized training image; and
subtracting the modified normalized training image from the normalized training image.

13. The method of claim 12, wherein creating an averaged training image comprises:
forming an average of a subset of lowest-valued pixels of a row of the normalized training image to form a row average;
replacing all pixels of the row of the normalized training image with the row average; and
performing the forming an average and the replacing all pixels for respective rows of the normalized training image.

14. The method of claim 12, wherein creating the local contrast training image comprises applying smoothing and morphological processing to the normalized training image.

15. The method of claim 12, wherein creating the local contrast training image further comprises modifying at least a portion of values obtained by the applying smoothing and morphological processing to compensate for density.

16. The method of claim 11, further comprising repeating for a plurality of training images the normalizing a training image, the segmenting the normalized training image, and the forming a prediction bias estimation image, the subtracting, and the applying.

17. The method of claim 11, wherein the at least one predictor comprises at least one neural network.

18. A non-transitory computer-readable medium containing executable instructions that, if executed, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
applying smoothing to at least a portion of the second prediction image; and
creating an equalized image using the prediction bias image.

19. The medium of claim 18, wherein creating an equalized image includes subtracting the prediction bias image from the image.

20. The medium of claim 18, wherein the image comprises a breast image.

21. The medium of claim 20, wherein the operations further comprise utilizing the equalized image in performing one or more of breast density estimation or breast type classification.

22. The medium of claim 18, wherein the operations further comprise applying at least one computer-aided diagnosis technique to the equalized image.

23. The medium of claim 18, wherein the operations further comprise forming a further segmented image based on the equalized image and using the further segmented image to derive one or more landmarks for image registration or to derive one or more location features for computer-aided diagnosis.

24. A non-transitory computer-readable medium containing executable instructions that, if executed, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
creating an equalized image using the prediction bias image,
wherein the first set of image features includes at least a subset of features selected from the group consisting of: Gaussian 2-jet at multiple scales; morphological opening image at multiple disk sizes; differences between image values and smoothed estimates of row-wise minimum image values; normalized distances; and relative vertical and horizontal pixel locations.

25. A non-transitory computer-readable medium containing executable instructions that, if executed, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
creating an equalized image using the prediction bias image,
wherein the second set of image features includes the first prediction image and Gaussian 2-jet at multiple scales.

26. A non-transitory computer-readable medium containing executable instructions that, if executed, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least one trained predictor;
creating an equalized image using the prediction bias image; and
training the at least one trained predictor, wherein the training comprises:
normalizing a training image selected from a set of training images to obtain a normalized training image;
segmenting the normalized training image to obtain a segmented training image;
forming a prediction bias estimation image;
subtracting the prediction bias estimation image from the normalized training image to obtain an equalized training image; and applying the segmented training image and the equalized training image to train the at least one trained predictor.

27. The medium of claim 26, wherein forming the prediction bias estimation image includes:
creating an averaged training image;
creating a local contrast training image;
adding the averaged training image and the local contrast training image to obtain a combined training image;
replacing at least a subset of pixels of the normalized training image with at least a subset of pixels of the combined training image to obtain a modified normalized training image; and
subtracting the modified normalized training image from the normalized training image.

28. The medium of claim 27, wherein creating an averaged training image comprises:
forming an average of a subset of lowest-valued pixels of a row of the normalized training image to form a row average;
replacing all pixels of the row of the normalized training image with the row average; and
performing the forming an average and the replacing all pixels for respective rows of the normalized training image.

29. The medium of claim 27, wherein creating the local contrast training image comprises applying smoothing and morphological processing to the normalized training image.

30. The medium of claim 27, wherein creating the local contrast training image further comprises modifying at least a portion of values obtained by the applying smoothing and morphological processing to compensate for density.

31. The medium of claim 26, wherein the operations further comprise repeating for a plurality of training images the normalizing a training image, the segmenting the normalized training image, the forming a prediction bias estimation image, the subtracting, and the applying.

32. The medium of claim 26, wherein the at least one predictor comprises at least one neural network.

33. An apparatus for image processing, comprising:
at least one processor; and
memory coupled to the at least one processor and configured to store executable instructions that, if executed by the at least one processor, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least, one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
applying smoothing to at least a portion of the second prediction image; and
creating an equalized image using the prediction bias image.

34. The apparatus of claim 33, wherein creating an equalized image includes subtracting the prediction bias image from the image.

35. The apparatus of claim 33, wherein the image comprises a breast image.

36. The apparatus of claim 35, wherein the operations further comprise utilizing the equalized image in performing one or more of breast density estimation or breast type classification.

37. The apparatus of claim 33, wherein the operations further comprise applying at least one computer-aided diagnosis technique to the equalized image.

38. The apparatus of claim 33, wherein the operations further comprise forming a further segmented image based on the equalized image and using the further segmented image to derive one or more landmarks for image registration or to derive one or more location features for computer-aided diagnosis.

39. An apparatus for image processing, comprising:
at least one processor; and
memory coupled to the at least one processor and configured to store executable instructions that, if executed by the at least one processor, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least, one trained predictor, wherein forming a prediction bias image comprises:
obtaining a first set of image features derived from the image, the normalized image, the segmented image, or a combination thereof;
applying the first set of image features to a first trained predictor to obtain a first prediction image;
obtaining a second set of image features derived at least in part from the first prediction image; and
applying the second set of image features to a second trained predictor to obtain a second prediction image; and
creating an equalized image using the prediction bias image,
wherein the first set of image features includes at least a subset of features selected from the group consisting of: Gaussian 2-jet at multiple scales; morphological opening image at multiple disk sizes; differences between image values and smoothed estimates of row-wise minimum image values; normalized distances; and relative vertical and horizontal pixel locations.

40. An apparatus for image processing, comprising:
at least one processor; and
memory coupled to the at least one processor and configured to store executable instructions that, if executed by the at least one processor, result in the implementation of operations comprising:
normalizing an image to obtain a normalized image;
segmenting the normalized image to obtain a segmented image;
forming a prediction bias image using features derived from the image, the normalized image, the segmented image, or a combination thereof, and used as inputs to at least, one trained predictor, wherein forming a prediction bias image comprises:

obtaining a first set of image features derived from the image, the normalized image, the segmented image, or a combination thereof;

applying the first set of image features to a first trained predictor to obtain a first prediction image;

obtaining a second set of image features derived at least in part from the first prediction image; and applying the second set of image features to a second trained predictor to obtain a second prediction image; and creating an equalized image using the prediction bias image, wherein the second set of image features includes the first prediction image and Gaussian 2-jet at multiple scales.

41. An apparatus for image processing, comprising:

at least one processor; and memory coupled to the at least one processor and configured to store executable instructions that, if executed by the at least one processor, result in the implementation of operations comprising:

normalizing an image to obtain a normalized image;

segmenting the normalized image to obtain a segmented image;

forming a prediction bias image using features derived from the image, the normalized image, the segmented image, or a combination thereof, and used as inputs to at least, one trained predictor;

creating an equalized image using the prediction bias image; and training the at least one trained predictor, wherein the training comprises:

normalizing a training image selected from a set of training images to obtain a normalized training image;

segmenting the normalized training image to obtain a segmented training image;

forming a prediction bias estimation image;

subtracting the prediction bias estimation image from the normalized training image to obtain an equalized training image; and applying the segmented training image and the equalized training image to train the at least one trained predictor.

42. The apparatus of claim 41, wherein forming the prediction bias estimation image includes:

creating an averaged training image;

creating a local contrast training image;

adding the averaged training image and the local contrast training image to obtain a combined training image;

replacing at least a subset of pixels of the normalized training image with at least a subset of pixels of the combined training image to obtain a modified normalized training image; and subtracting the modified normalized training image from the normalized training image.

43. The apparatus of claim 42, wherein creating an averaged training image comprises:

forming an average of a subset of lowest-valued pixels of a row of the normalized training image to form a row average;

replacing all pixels of the row of the normalized training image with the row average; and performing the forming an average and the replacing all pixels for respective rows of the normalized training image.

44. The apparatus of claim 42, wherein creating the local contrast training image comprises applying smoothing and morphological processing to the normalized training image.

45. The apparatus of claim 42, wherein creating the local contrast training image further comprises modifying at least a portion of values obtained by the applying smoothing and morphological processing to compensate for density.

46. The apparatus of claim 41, wherein the operations further comprise repeating for a plurality of training images the normalizing a training image, the segmenting the normalized training image, the forming a prediction bias estimation image, the subtracting, and the applying.

47. The apparatus of claim 41, wherein the at least one predictor comprises at least one neural network.

* * * * *